United States Patent
Kakutani

(10) Patent No.: US 7,397,580 B2
(45) Date of Patent: Jul. 8, 2008

(54) EJECTION CONTROL OF QUALITY-ENHANCING INK

(75) Inventor: Toshiaki Kakutani, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 713 days.

(21) Appl. No.: 10/934,097

(22) Filed: Sep. 3, 2004

(65) Prior Publication Data
US 2005/0122534 A1  Jun. 9, 2005

(30) Foreign Application Priority Data
Sep. 5, 2003  (JP)  ............................ 2003-313764

(51) Int. Cl.
G06F 15/00  (2006.01)
(52) U.S. Cl. ..................... 358/1.9; 358/3.03; 358/3.13; 358/1.16; 347/5; 347/15; 347/96
(58) Field of Classification Search ................. 358/1.9, 358/535, 521, 3.03, 3.27, 298, 75, 1.17; 347/9, 347/96, 5, 19, 15, 16
See application file for complete search history.

(56) References Cited

U.S. PATENT DOCUMENTS

| | | | |
|---|---|---|---|
| 4,809,063 A | * | 2/1989 | Moriguchi et al. .......... 358/535 |
| 5,031,050 A | * | 7/1991 | Chan .......................... 358/3.16 |
| 5,635,969 A | * | 6/1997 | Allen ........................... 347/96 |
| 6,199,968 B1 | * | 3/2001 | Katakura et al. ............... 347/9 |
| 6,407,825 B1 | * | 6/2002 | Couwenhoven et al. ...... 358/1.9 |

* cited by examiner

*Primary Examiner*—King Y. Poon
*Assistant Examiner*—Jamares Washington
(74) *Attorney, Agent, or Firm*—Martine Penilla & Gencarella, LLP

(57) ABSTRACT

This invention is a printing control method of generating print data to be supplied to a print unit which is capable of forming dots on a print medium by ejecting at least one type of colored ink containing a color material and a quality-enhancing ink for enhancing quality of a printed material. The printing control method comprises a color conversion step of converting pixel values into multiple gradation data of each ink, the pixel values representing color of each pixel of given image data, the multiple gradation data of each ink expressing the color of the pixel by using the colored ink and the quality-enhancing ink available in the print unit and a gradation-reduction step of generating at least part of colored dot data and transparent dot data by ordered dither method. The gradation-reduction step includes a step of generating the transparent dot data in succession with specific colored dot data using a quality-enhancing ink threshold value which has a value generated according to a value read from a specific dither matrix used for generating the specific colored dot data for a specific colored ink.

9 Claims, 15 Drawing Sheets

Fig.3
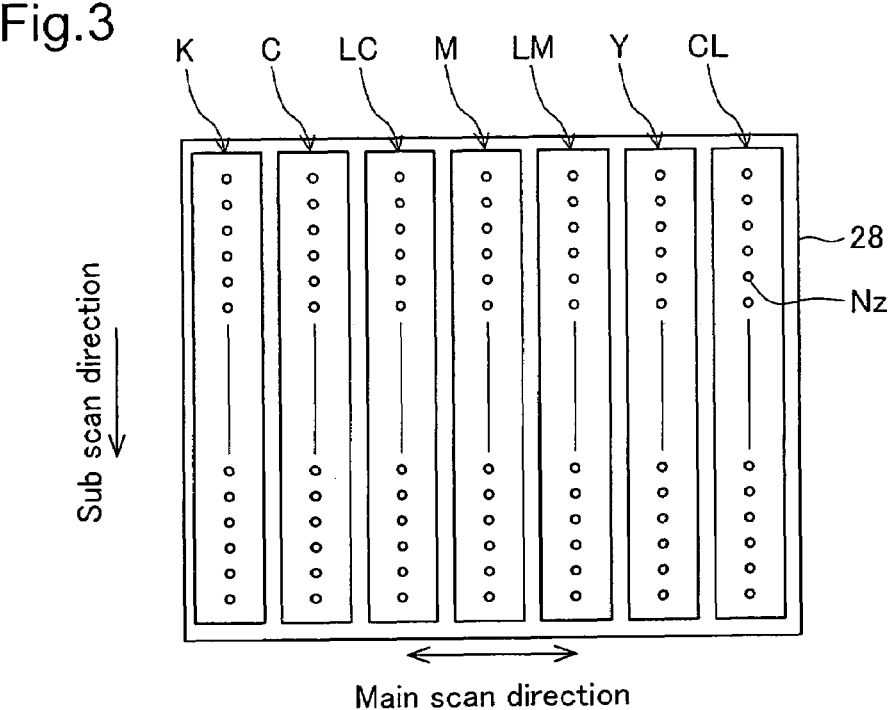
Fig.4
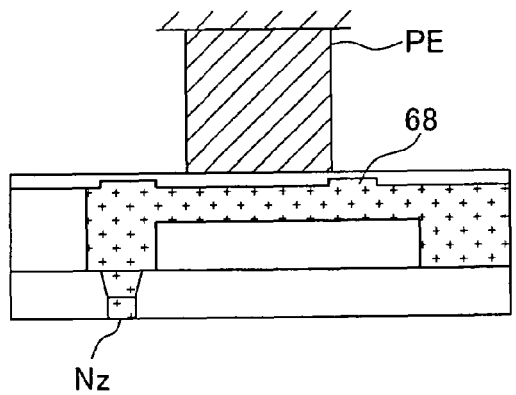
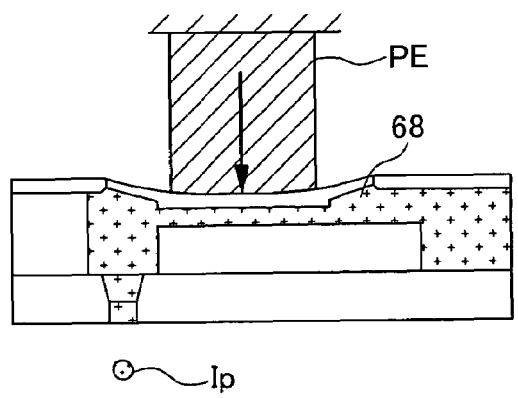

Fig.5(a)
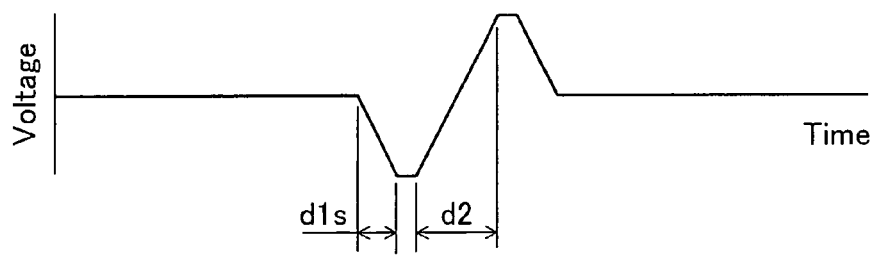
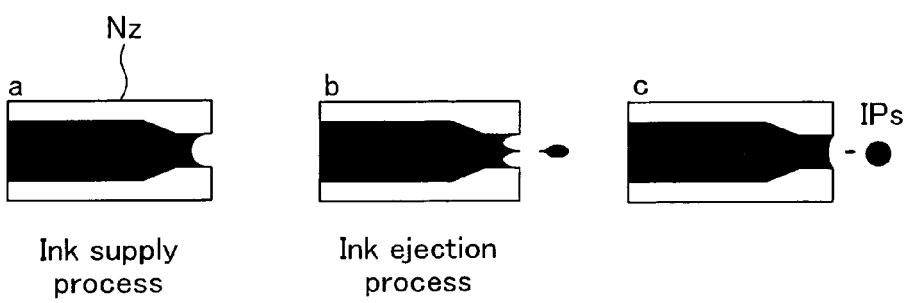
Fig.5(b)
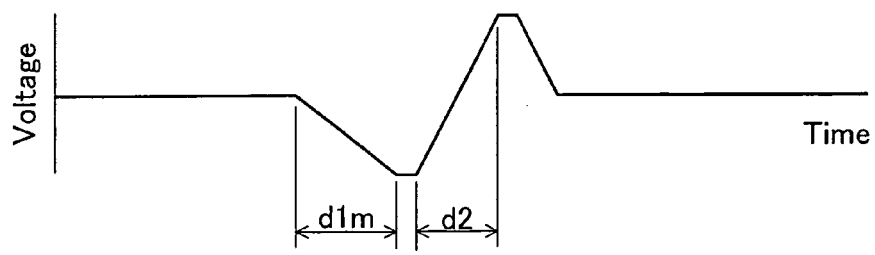
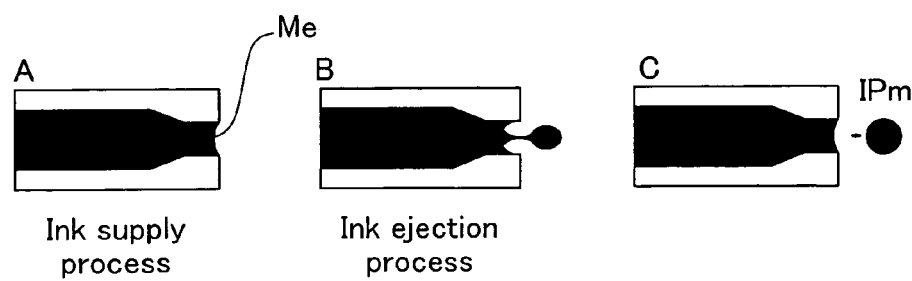

First Embodiment

Fig.11

Gradation-reduction Processing Method

|  | Gradation-reduction processing method | Processing unit |
|---|---|---|
| C, M, LC, LM | Error diffusion | Each raster line |
| K, Y, CL | Ordered dither method | Each pixel |

Gradation-reduction Processing Using Error Diffusion (C, M, LC, LM)

*: Pixel of interest

Gradation-reduction Processing (K, Y, CL) Using the Ordered Dither Method

Fig.16(a)
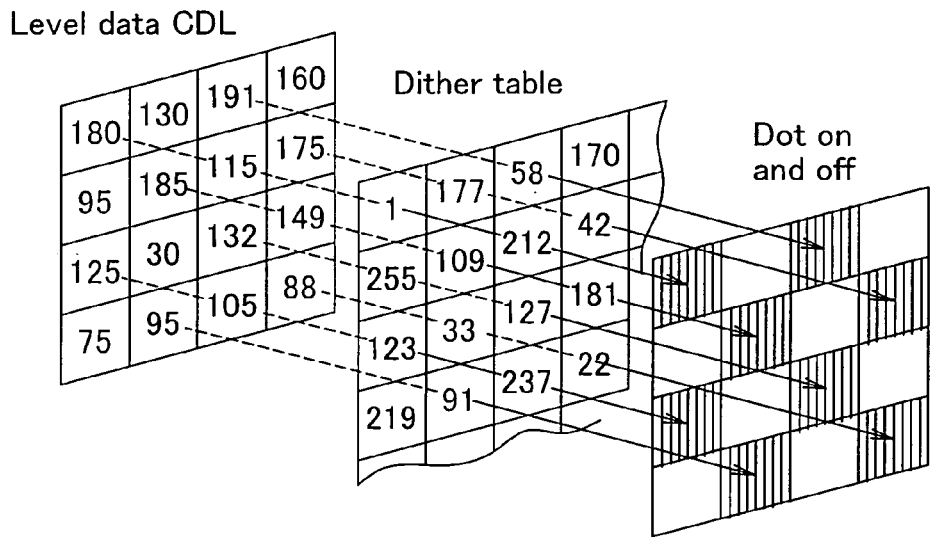
Fig.16(b)
|   | TM |   |    |
|---|----|---|----|
| 1 | 9  | 3 | 11 |
| 13| 5  | 15| 7  |
| 4 | 12 | 2 | 10 |
| 16| 8  | 14| 6  |
|    | UM |   |    |
|----|----|---|----|
| 16 | 8  | 14| 6  |
| 4  | 12 | 2 | 10 |
| 13 | 5  | 15| 7  |
| 1  | 9  | 3 | 11 |
Fig.17
Second embodiment
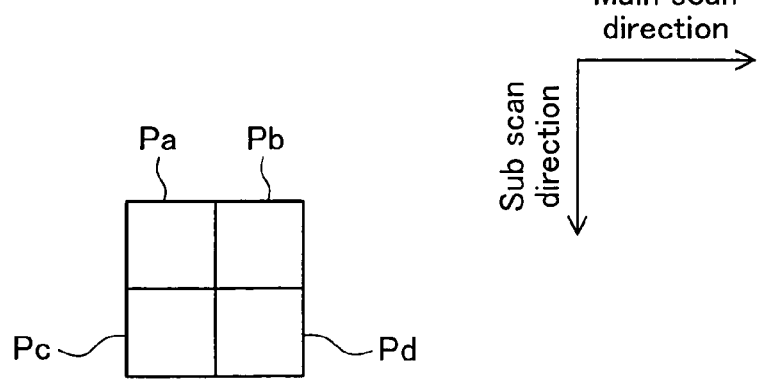

EJECTION CONTROL OF QUALITY-ENHANCING INK

BACKGROUND OF THE INVENTION

1. Field of the Invention

The present invention relates to gradation-reduction processing technology for reducing the number of gradations for image data.

2. Description of the Related Art

In recent years, as computer output devices, printers that eject ink from nozzles of a printing head are becoming very popular. For example, as disclosed in Unexamined Patent No. 2002-144551, by using quality-enhancing ink for improving the quality of printed matter, there is an attempt to improve quality of printed matter by improving coloring, moisture resistance, and light resistance, and suppressing glossiness. This kind of quality-enhancing ink is almost transparent, so with the gradation-reduction processing that is performed for generating dot data that shows the formation status of transparent dots on each pixel, even more than data precision, it is highly desirable to have shortened time required for the data generating process.

However, in the past, there had not been consideration of constructing a processing method from the perspective of shortening the time required for gradation-reduction processing that is performed with this kind of dot data generating process for transparent dots.

SUMMARY OF THE INVENTION

The present invention was created to solve the problems described above for the prior art, and its purpose is to provide a technology that shortens the time required for printing processing for printing using quality-enhancing ink for improving the quality of printed matter.

In order to attain the above and the other objects of the present invention, there is provided a printing control method of generating print data to be supplied to a print unit to print. The print unit is capable of forming dots on a print medium by ejecting at least one type of colored ink containing a color material and a quality-enhancing ink for enhancing quality of a printed material. The printing control method comprising (a) a color conversion step of converting pixel values into multiple gradation data of each ink, the pixel values representing color of each pixel of given image data, the multiple gradation data of each ink expressing the color of the pixel by using the colored ink and the quality-enhancing ink available in the print unit; and (b) a gradation-reduction step of generating at least part of colored dot data and transparent dot data by ordered dither method, according to the generated multiple gradation data of each ink by the color conversion, the colored dot data representing formation status of colored dots formed with the colored ink on each of printing pixels, the transparent dot data representing formation status of transparent dots formed with the quality-enhancing ink on each printing pixel. The gradation-reduction step includes a step of generating the transparent dot data in succession with specific colored dot data using a quality-enhancing ink threshold value, the quality-enhancing ink threshold value having a value generated according to a value read from a specific dither matrix used for generating the specific colored dot data for a specific colored ink.

With the printing control method of the present invention, transparent dot data is generated using a threshold value that is generated from the dither matrix used for generating colored dot data, so it is possible to reduce the time required for reading the threshold value from the main memory or hard disk and improve the processing speed.

Here, there are structures for "generating transparent dot data continuous with colored dot data" that include, for example, a structure such as one that would have the dot data generating process continue for each of the pixels, a structure such as one that would have the dot data generating process continue for each pixel block, or a structure such as one that would have the dot data generating process continue for each size dot of each pixel.

Specifically, immediately after completion of processing on pixels, pixel blocks, or each size dot formed on a pixel for a specific colored ink, processing is performed for pixels, pixel blocks, or each size dot formed on a pixel for the quality-enhancing ink, or alternatively, immediately after completion of processing on pixels, pixel blocks, or each size dot formed on a pixel for quality-enhancing inks, processing may be performed for pixels, pixel blocks, or each size dot formed on a pixel for a specific colored ink.

Note that the present invention can be realized in various formats such as a printing device, a computer program that realizes the methods thereof or the function of the device on a computer, where the computer program is stored on a computer-readable storage medium, etc.

BRIEF DESCRIPTION OF THE DRAWINGS

FIG. 3 is an explanatory diagram that shows the arrangement of nozzles Nz on the bottom surface of the printing head 28.

FIG. 4 is an explanatory diagram that shows the structure of the nozzles Nz and the piezo elements PE.

FIGS. 5(a) and 5(b) are explanatory diagrams that show the relationship between two types of drive waveforms for the nozzles Nz and the two sizes of ink drops IPs and IPm that are ejected when ink is ejected.

FIG. 11 is an explanatory diagram that shows the gradation-reduction processing method of the first embodiment of the present invention.

FIGS. 16(*a*) and 16(*b*) are explanatory diagrams that show the method of determining whether or not dots are formed using the ordered dither method.

FIG. 17 is an explanatory diagram that shows a pixel block that is a unit for executing gradation-reduction processing using the ordered dither method for the second embodiment of the present invention.

DESCRIPTION OF THE PREFERRED EMBODIMENTS

A. Configuration of System

Figure 1:
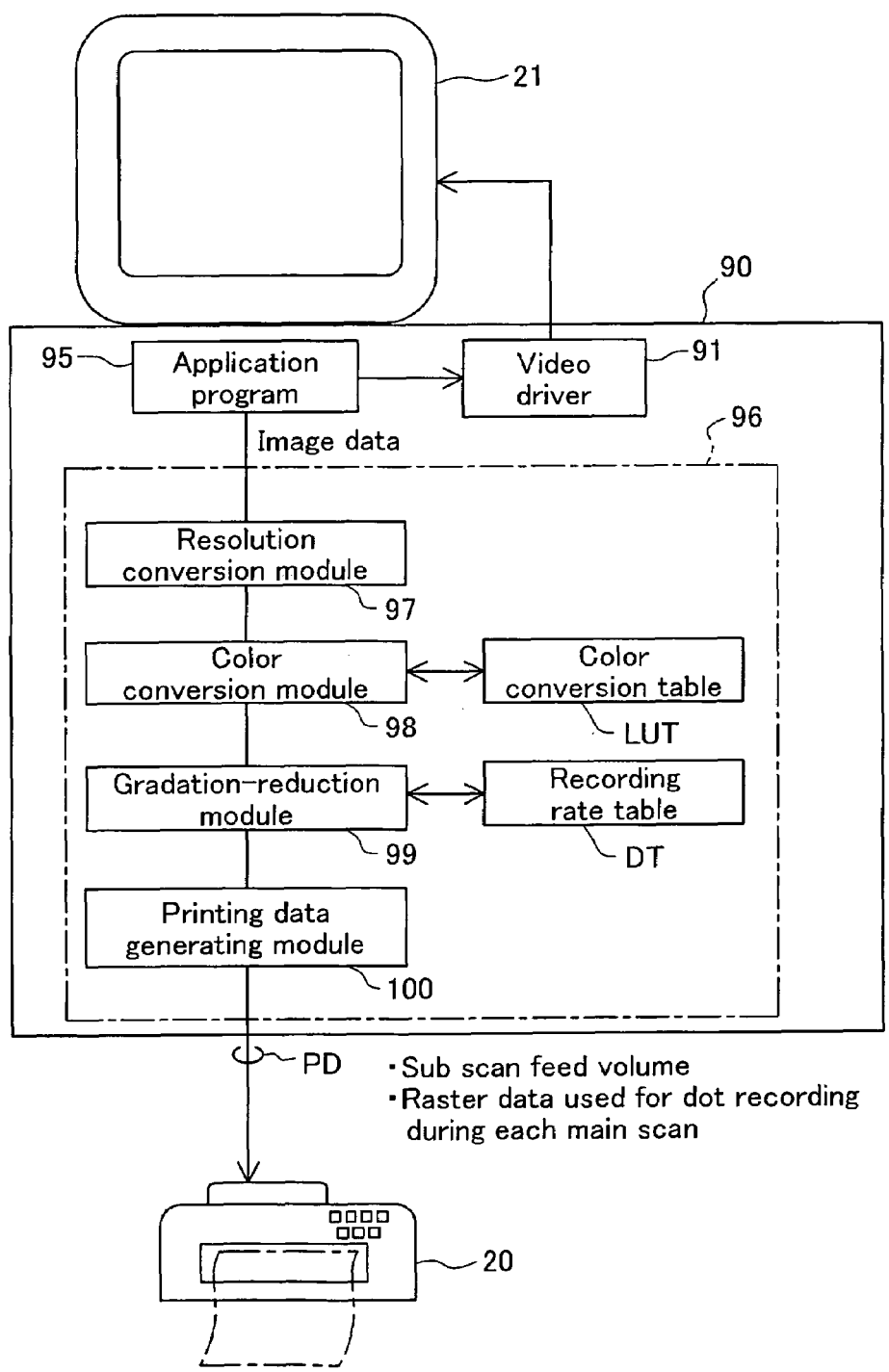
FIG. 1 is a block diagram that shows the structure of the printing system as an embodiment of the present invention.

FIG. 1 is a block diagram schematically illustrating the configuration of a printing system in one embodiment of the invention. This printing system includes a computer 90 functioning as a printing control apparatus and a color printer 20 functioning as a print unit. The combination of the color printer 20 with the computer 90 is regarded as a "printing apparatus" in the broad sense.

Application program 95 operates on computer 90 under a specific operating system. A video driver 91 and a printer driver 96 are incorporated in the operating system. The application program 95 outputs image data, which goes through a series of image processing in the printer driver 96 and is given as print data PD to the color printer 20. The application program 95 also outputs image data to display a processed image on a CRT 21 via the video driver 91.

The printer driver 96 includes a resolution conversion module 97, a color conversion module 98, a gradation-reduction module 99, a print data generation module 100, multiple color conversion tables LUT, and a dot rate table DT. The functions of these constituents will be discussed later.

The printer driver 96 is equivalent to a program functioning to generate the print data PD. The program of attaining the functions of the printer driver 96 is supplied in the form recorded in a computer readable recording medium. Typical examples of such computer readable recording medium include flexible disks, CD-ROMs, magneto-optic disks, IC cards, ROM cartridges, punched cards, prints with barcodes or other codes printed thereon, internal storage devices (memories like RAM and ROM) and external storage devices of the computer, and a diversity of other computer readable media.

Figure 2:
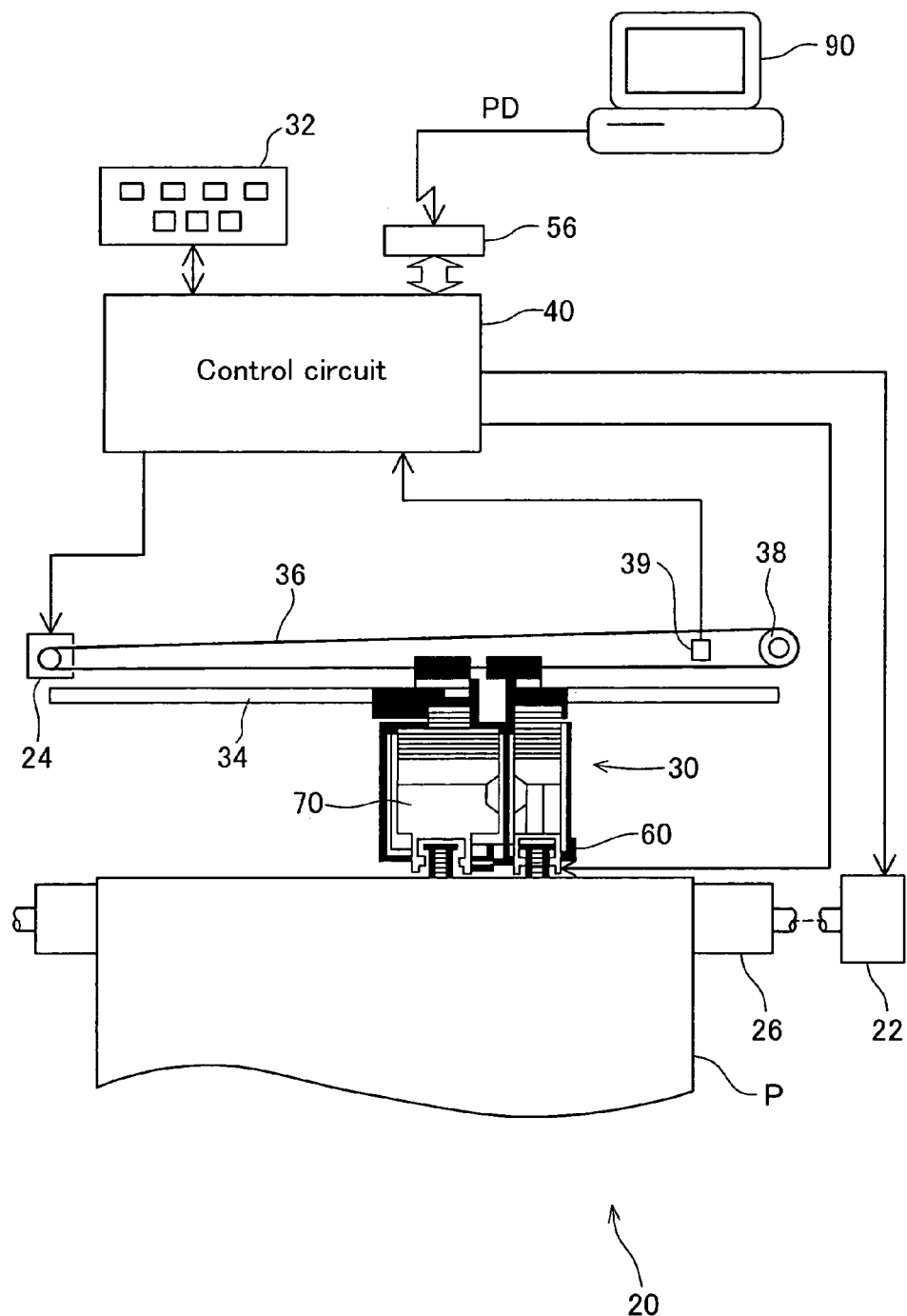
FIG. 2 is a schematic structural diagram of the color printer 20.

FIG. 2 schematically illustrates the structure of the color printer 20. The color printer 20 has a sub-scan drive unit that activates a paper feed motor 22 to feed a sheet of printing paper P in a sub-scanning direction, a main scan drive unit that activates a carriage motor 24 to move a carriage 30 back and forth in an axial direction of a paper feed roller 25 (in a main scanning direction), a head drive mechanism that drives a print head unit 60 (also called 'print head assembly') mounted on the carriage 30 to control ink ejection and dot formation, and a control circuit 40 that transmits signals to and from the paper feed motor 22, the carriage motor 24, the print head unit 60, and an operation panel 32. The control circuit 40 is connected to the computer 90 via a connector 56.

FIG. 3 shows an arrangement of nozzles on a bottom face of a print head 28. Nozzle arrays for ejecting color inks containing color material and transparent quality-enhancing ink CL are formed on the bottom face of the print head 28. The structure of the embodiment uses black ink K, cyan ink C, light cyan ink LC, magenta ink M, light magenta ink LM, and yellow ink Y as the color inks.

The color inks are, however, not restricted to these six inks K, C, LC, M, LM, and Y, but may be specified arbitrarily according to the desired quality of printing images. For example, four inks K, C, M, and Y may be available. In another example, only black ink K may be used as the color ink. Dark yellow ink having lower lightness than that of the yellow ink Y, gray ink having higher lightness than that of the black ink K, blue ink, red ink, and green ink may be used additionally in any combination.

The quality-enhancing ink CL may be transparent and colorless ink that has the equivalent gloss to those of the other inks and improves the color development properties of the other inks. One typical example of the quality-enhancing ink CL is one of inks disclosed in Japanese Patent Laid-Open Gazette No. Hei 8-60059. The quality-enhancing ink restrains a variation in gloss and improves the color development properties, thus ensuring the high quality of printed images. Application of water resistance-enhancing and light stability-enhancing ink to the quality-enhancing ink CL effectively improves the water resistance and the light stability of printed images.

Each nozzle has a piezoelectric element as an ejection actuating element to actuate each nozzle for ejection of ink droplets as described later. In a printing process, ink droplets are ejected from respective nozzles, while the print head 28 shifts in a main scanning direction.

FIG. 4 shows the structure of a nozzle Nz and a piezoelectric element PE. The piezoelectric element PE is located at a position in contact with an ink passage 68 that leads the flow of ink to the nozzle Nz. In the structure of the embodiment, a voltage is applied between electrodes provided on both ends of the piezoelectric element PE to deform one side wall of the ink passage 68 and thereby attain high-speed ejection of an ink droplet Ip from the end of the nozzle Nz.

FIGS. 5(*a*) and 5(*b*) show two driving waveforms of the nozzle Nz for ink ejection and resulting small-size and medium-size ink droplets IPs and IPm ejected in response to the driving waveforms. FIG. 5(*a*) shows a driving waveform to eject a small-size ink droplet IPs that independently forms a small-size dot. FIG. 5(*b*) shows a driving waveform to eject a medium-size ink droplet IPm that independently forms a medium-size dot.

The small-size ink droplet IPs is ejected from the nozzle Nz by two steps given below, that is, an ink supply step and an ink ejection step:

(1) Ink supply step (d1s): The ink passage 68 (see FIG. 4) is expanded at this step to receive a supply of ink from a non-illustrated ink tank. A decrease in potential applied to the. piezoelectric element PE contracts the piezoelectric element PE and thereby expands the ink passage 68; and (2) Ink ejection step (d2): The ink passage 68 is compressed to eject ink from the nozzle Nz at this step. An increase in potential applied to the piezoelectric element PE expands the piezoelectric element PE and thereby compresses the ink passage 68.

The medium-size ink droplet IPm is formed by decreasing the potential applied to the piezoelectric element PE at a relatively low speed in the ink supply step as shown in FIG. 5(*b*). A relatively gentle slope of the decrease in potential slowly expands the ink passage 68 and thus enables a greater amount of ink to be fed from the non-illustrated ink tank.

The high decrease rate of the potential causes an ink interface Me to be pressed significantly inward the nozzle Nz, prior to the ink ejection step as shown in FIG. 5(a). This reduces the size of the ejected ink droplet. The low decrease rate of the potential, on the other hand, causes the ink interface Me to be pressed only slightly inward the nozzle Nz, prior to the ink ejection step as shown in FIG. 5(b). This increases the size of the ejected ink droplet. The procedure of this embodiment varies the size of the ejected ink droplet by varying the rate of change in potential in the ink supply step.

Figure 6:
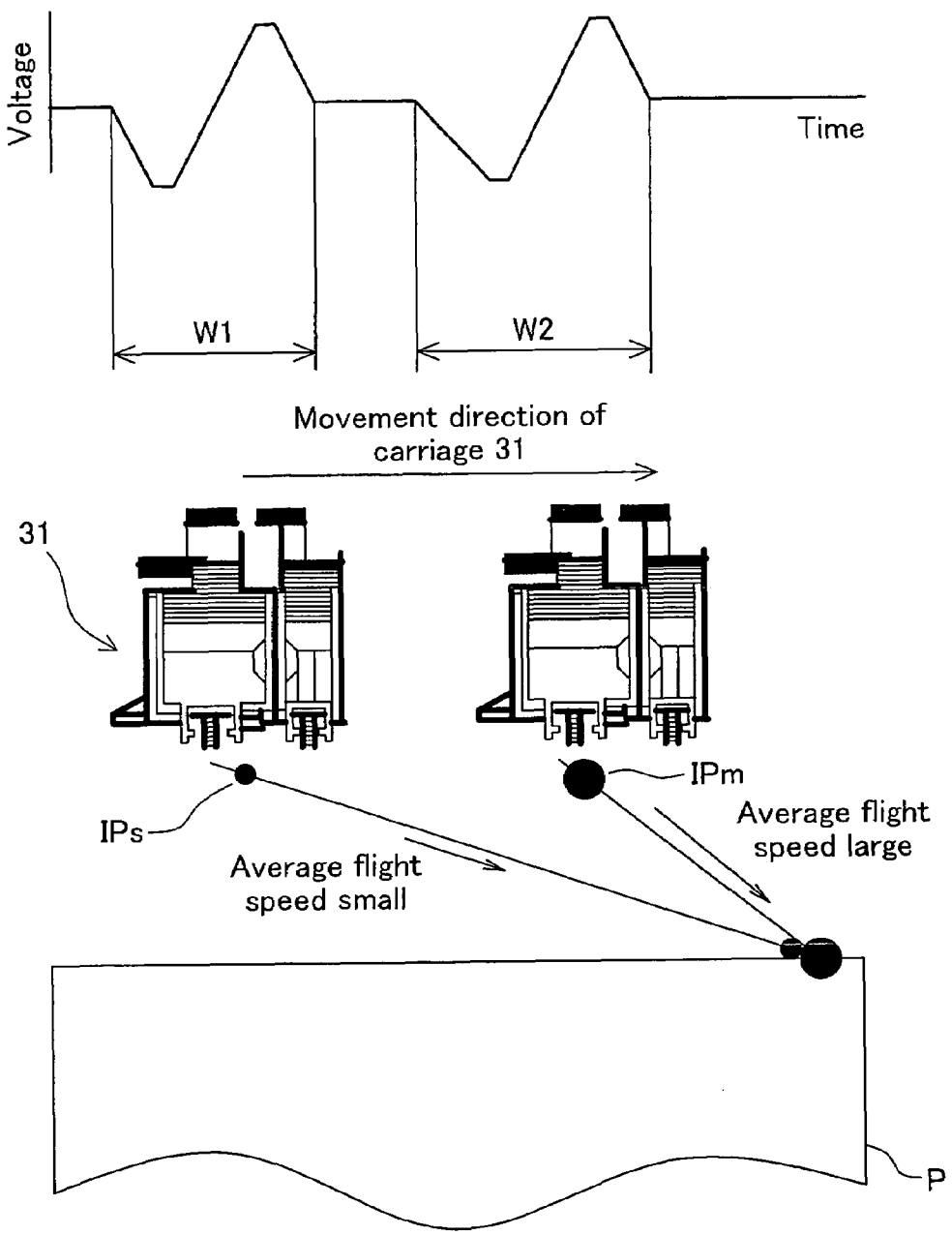
FIG. 6 is an explanatory diagram that shows the formation status of three sizes of dots large, medium, and small at the same position using small ink drops IPs and medium ink drops IPm.

FIG. 6 shows a process of using the small-size and medium-size ink droplets IPs and IPm to form three variable-size dots, that is, large-size, medium-size, and small-size dots, at an identical position. A driving waveform W1 is output to eject the small-size ink droplet IPs, and a driving waveform W2 is output to eject the medium-size ink droplet IPm. As clearly understood from FIG. 6, in the structure of this embodiment, the driving waveform W2 for ejection of the medium-size ink droplet IPm is output after a predetermined time period elapsed since output of the driving waveform W1 for ejection of the small-size ink droplet IPs.

The two driving waveforms W1 and W2 are output to the piezoelectric element PE at these timings, so that the medium-size ink droplet IPm reaches the same hitting position as the hitting position of the small-size ink droplet IPs. As clearly shown in FIG. 6, ejection of the medium-size ink droplet IPm having a relatively high mean flight speed after the predetermined time period elapsed since ejection of the small-size ink droplet IPs having a relatively low mean flight speed enables the two variable-size ink droplets IPs and IPm to reach at substantially the same hitting positions. The mean flight speed represents the average value of flight speed from ejection to hitting against printing paper and decreases with an increase in speed reduction rate.

The ejection speeds of the small-size ink droplet IPs and the medium-size ink droplet IPm are remarkably higher than the moving speed of the carriage 31 in the main scanning direction. The small-size ink droplet IPs is thus not flown alone but is joined with the subsequently ejected medium-size ink droplet IPm to form a large-size ink droplet IPL for formation of a large-size dot. For the purpose of better understanding, the moving speed of the carriage 31 in the main scanning direction is exaggerated in FIG. 6.

The color printer 20 having the hardware configuration described above actuates the piezoelectric elements of the print head 28, simultaneously with a feed of printing paper P by means of the paper feed motor 22 and reciprocating movements of the carriage 30 by means of the carriage motor 24. Ink droplets of respective colors are thus ejected to form large-size, medium-size, and small-size ink dots and form a multi-color, multi-tone image on the printing paper P.

B. Print Data Generation Process in First Embodiment

Figure 7:
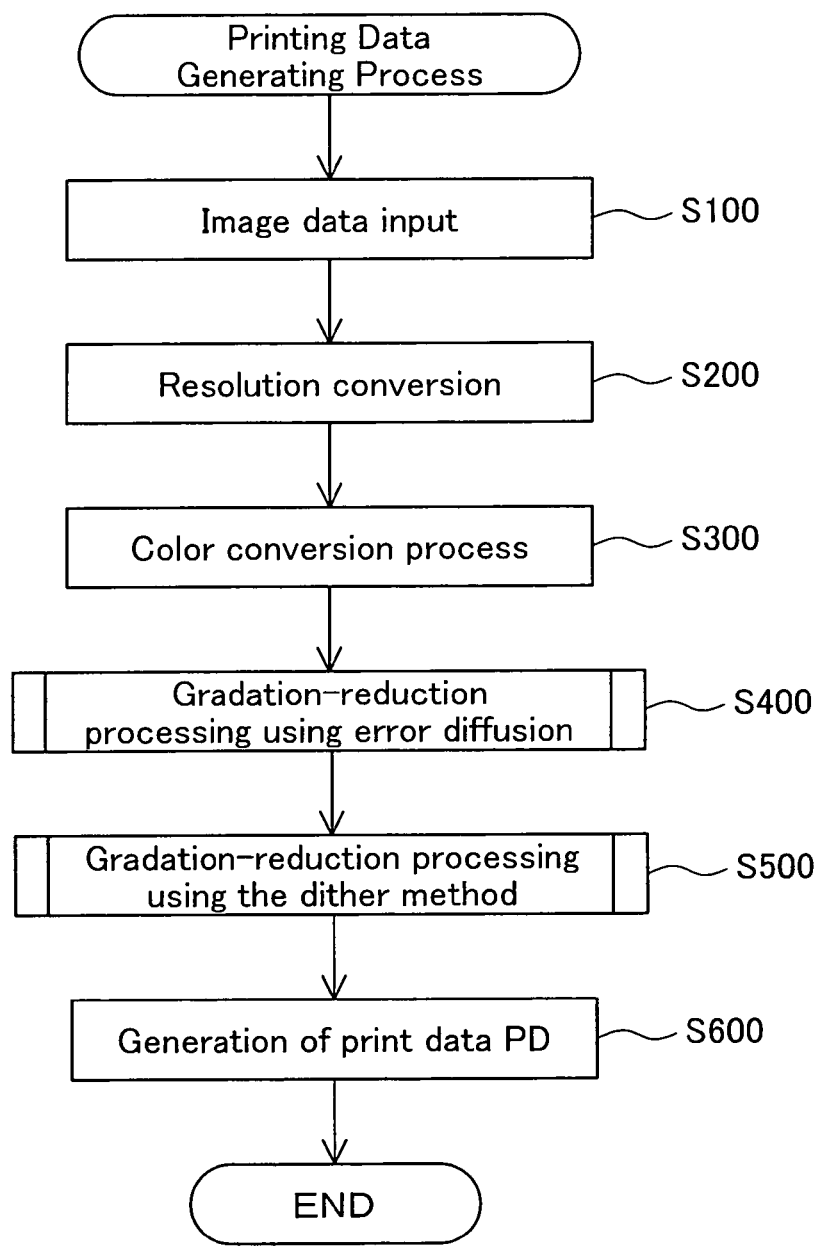
FIG. 7 is a flow chart that shows the print data generating processing routine for an embodiment of the present invention.

FIG. 7 is a flowchart showing a routine of print data generation process executed in the first embodiment. The print data generation process is executed by the computer 90 to generate print data PD, which is to be supplied to the color printer 20.

At step S100, the printer driver 96 (FIG. 1) inputs image data from the application programs 95. The input of the image data is triggered by a printing instruction given by the application programs 95. Here the image data are RGB data.

At step S200, the resolution conversion module 97 converts the resolution of the input RGB image data (in other words, the pixel count per unit length) to the printing resolution. Here, the "printing resolution" correlates to the pitch at which dots are formed at the color printer 20.

At step S300, the RGB image data is converted to multiple gradation data of inks that can be used by the color printer 20. The color conversion process is performed while referencing the color conversion table LUT.

Figure 8:
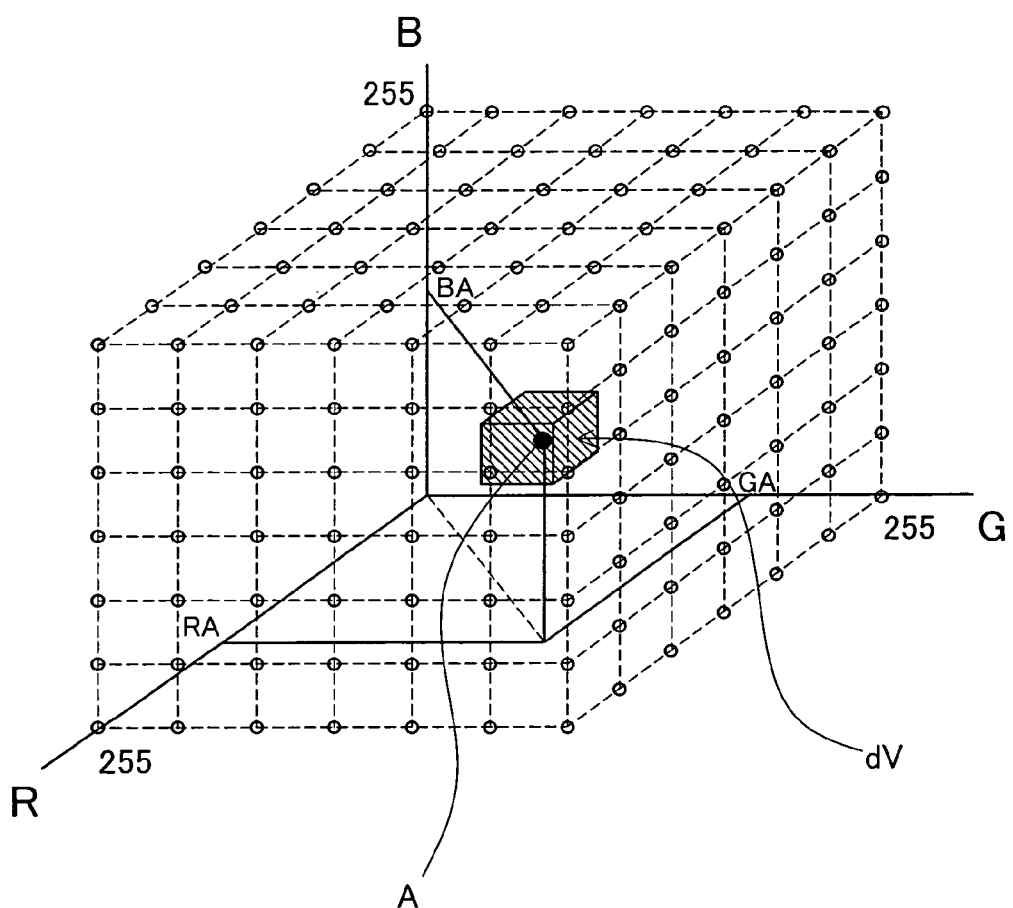
FIG. 8 is an explanatory diagram that shows the color conversion table LUT that is used with the color conversion process for an embodiment of the present invention.

FIG. 8 is an explanatory diagram that shows the color conversion table LUT used with the color conversion processing of an embodiment of the present invention. With the color conversion table LUT, the gradation values of each color RGB are captured in three mutually intersecting axes, and space defined by these three axes are subdivided into a grid form. At each subdivided grid point is stored the gradation value of each ink for expressing in colored inks and quality-enhancing inks the colors shown by the gradation values of each of the colors RGB.

The color conversion module 98 performs color conversion while referencing the color conversion table LUT. For example, when each gradation value of the image data R, G, and B are respectively RA, GA, and BA, first, a search is done for a cube dV such as one that includes point A expressed by coordinates (RA, GA, BA) on the color conversion table LUT. The cube dV is a cube that has as its vertex eight grid points selected so as to include point A.

The color conversion module 98 reads the colored ink (C, M, Y, K, LC, and LM) and quality-enhancing ink CL gradation values stored at these eight grid points.

Figure 9A:
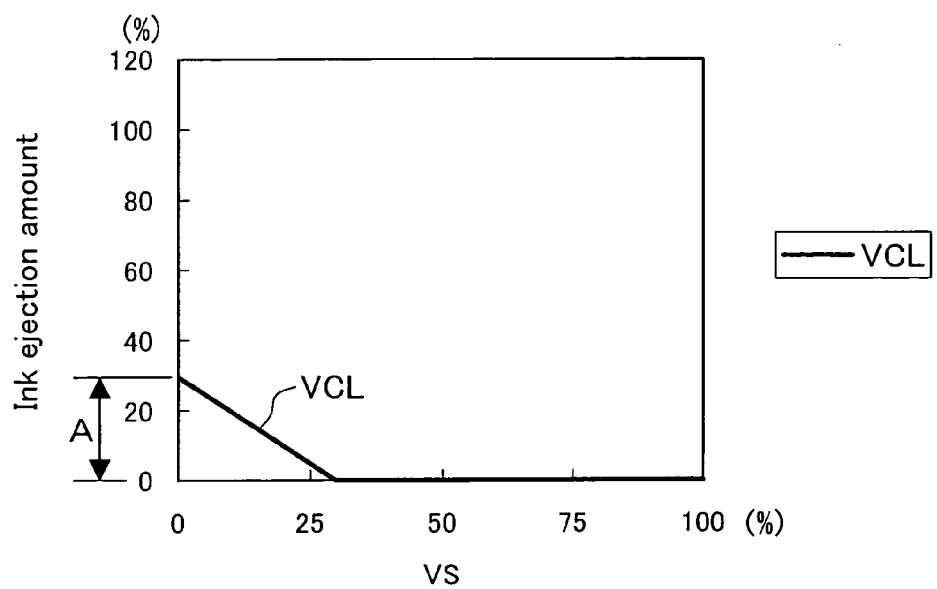
FIGS. 9(a) and 9(b) are graphs that show an example of the relationship between the ejection volume of colored ink and the ejection volume of quality-enhancing ink.
Figure 9B:
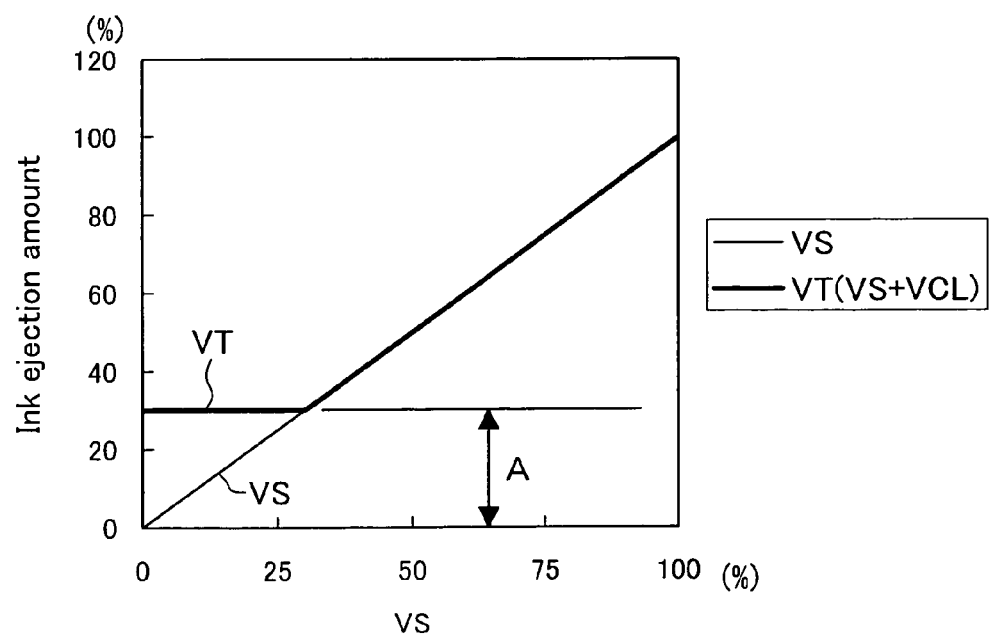

FIGS. 9(a) and 9(b) are graphs that show an example of the relationship between the ejection volume of colored ink and the ejection volume of quality-enhancing ink. FIG. 9(a) shows the relationship between the colored ink ejection volume VS and the quality-enhancing ink ejection volume VCL. FIG. 9(b) shows the relationship between the colored ink ejection volume VS and the total vale of the colored ink and quality-enhancing ink ejection volume VT (=VS+VCL). The horizontal axis is the colored ink ejection volume VS, and the vertical axis is the ink ejection volume shown with the explanatory note.

As can be seen from FIGS. 9(a) and 9(b), when the printing medium is glossy paper, for example, the quality-enhancing ink ejection volume is determined such that a large volume of quality-enhancing ink is ejected on the blank area for which colored ink is not ejected. The reason for this determination is that when printing on a printing medium that has a relatively strong glossiness, there is a tendency for the glossiness to be stronger in areas that have large volumes of colored ink ejected, so if a greater volume of quality-enhancing ink is ejected at white pixels where dots are not formed, it is possible to suppress gloss unevenness.

At step S400, the gradation-reduction module 99 performs gradation-reduction processing. gradation-reduction processing is the process of reducing the gradation count of multiple gradation data with this embodiment to 4 gradations which is the number of gradations that can be expressed with each printing pixel by the color printer 20. With this embodiment, these 4 gradations are expressed as "no dots formed," "small dots formed," "medium dots formed," and "large dots formed." With this embodiment, the gradation-reduction process is performed using two gradation-reduction processes with different processing contents, the ordered dither method and the error diffusion method.

Figure 10A:
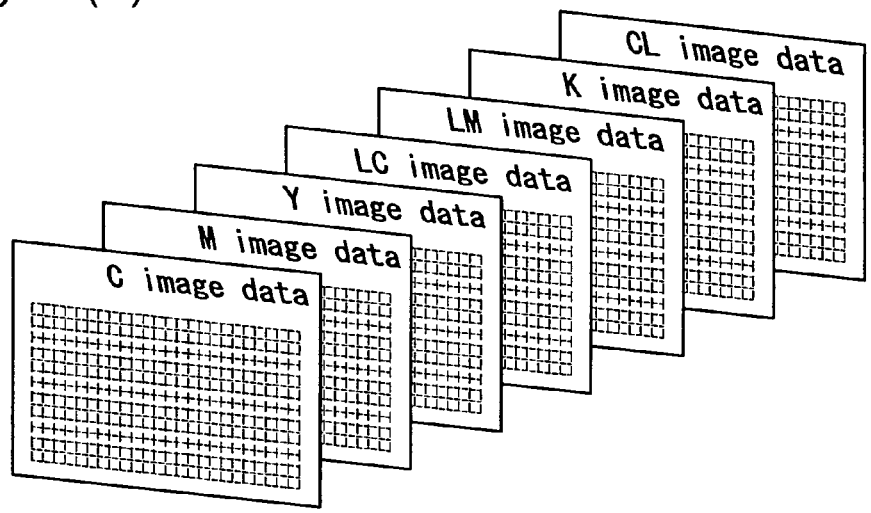
FIGS. 10(a) and 10(b) are explanatory diagrams that show the gradation-reduction processing methods using two gradation-reductio having different processing contents.
Figure 10B:
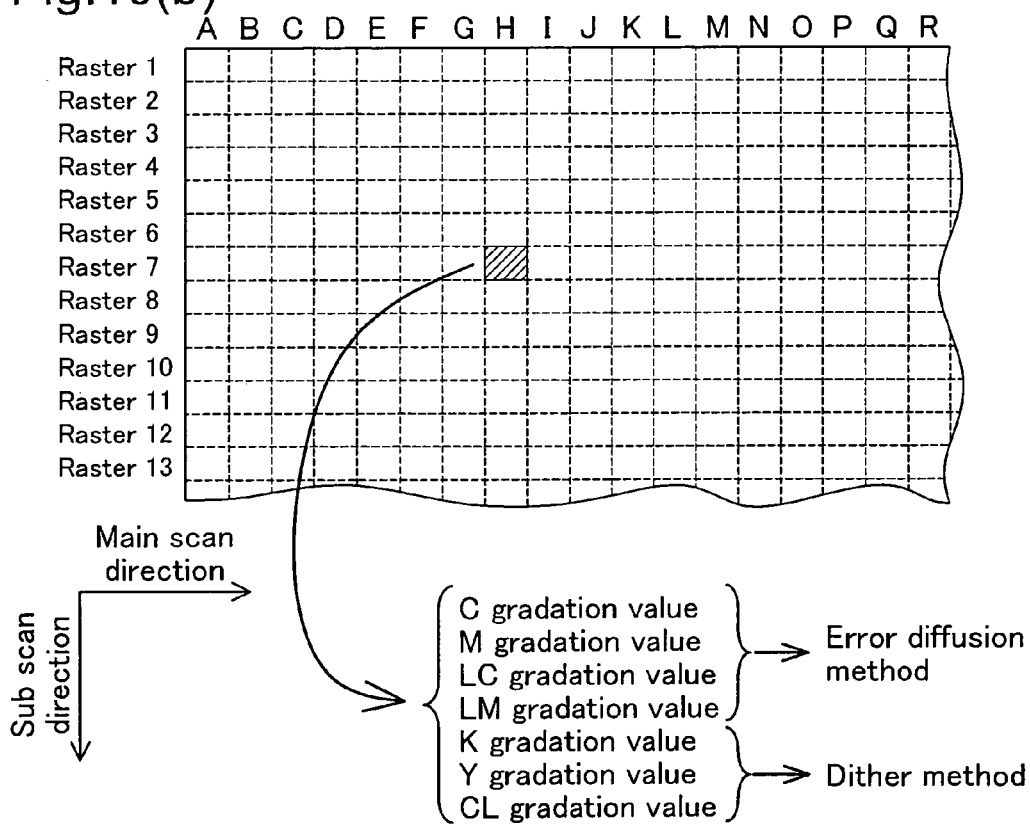

FIGS. 10(a) and 10(b) are explanatory diagrams that show gradation-reduction processing methods using two gradation-reduction processing methods with different processing contents. FIG. 10(a) shows seven multiple gradation data generated for each ink. FIG. 10(b) shows a gradation-reduction processing method for each pixel of each multiple gradation data.

Multiple gradation data includes multiple gradation data of six colored inks C, M, LC, LM, K, and Y, and multiple gradation data of quality-enhancing ink CL (FIG. 10(a)). Of the multiple gradation data of the six colored inks C, M, LC, LM, K, and Y, the multiple gradation data of the four colored inks C, M, LC, and LM undergo gradation-reduction processing by the error diffusion method. Meanwhile, the multiple gradation data of the remaining two colored inks K and Y and the quality-enhancing ink CL undergo gradation-reduction processing by the ordered dither method.

The reason that the error diffusion method is used for the gradation-reduction processing of the multiple gradation data of the four inks C, M, LC, and LM is because the dispersibility of these ink dots has a relatively large effect on image quality. Meanwhile, the reason that the ordered dither method is used for gradation-reduction processing of the multiple gradation data of the other three inks K, Y, and CL is because processing speed is given priority considering the fact that degradation of the dispersibility of these ink dots do not greatly effect image quality.

FIG. 11 is an explanatory diagram that shows the gradation-reduction processing method of the first embodiment of the present invention. As described above, with this embodiment, for the gradation-reduction processing of the multiple gradation data of the four inks C, M, LC, and LM and the other three inks, the error diffusion method and the ordered dither method are used, respectively. Here, with gradation-reduction processing that uses the error diffusion method, processing is performed for each raster line formed from many pixels, and in contrast to this, with gradation-reduction processing that uses the ordered dither method, processing is performed for each pixel.

Figure 12:
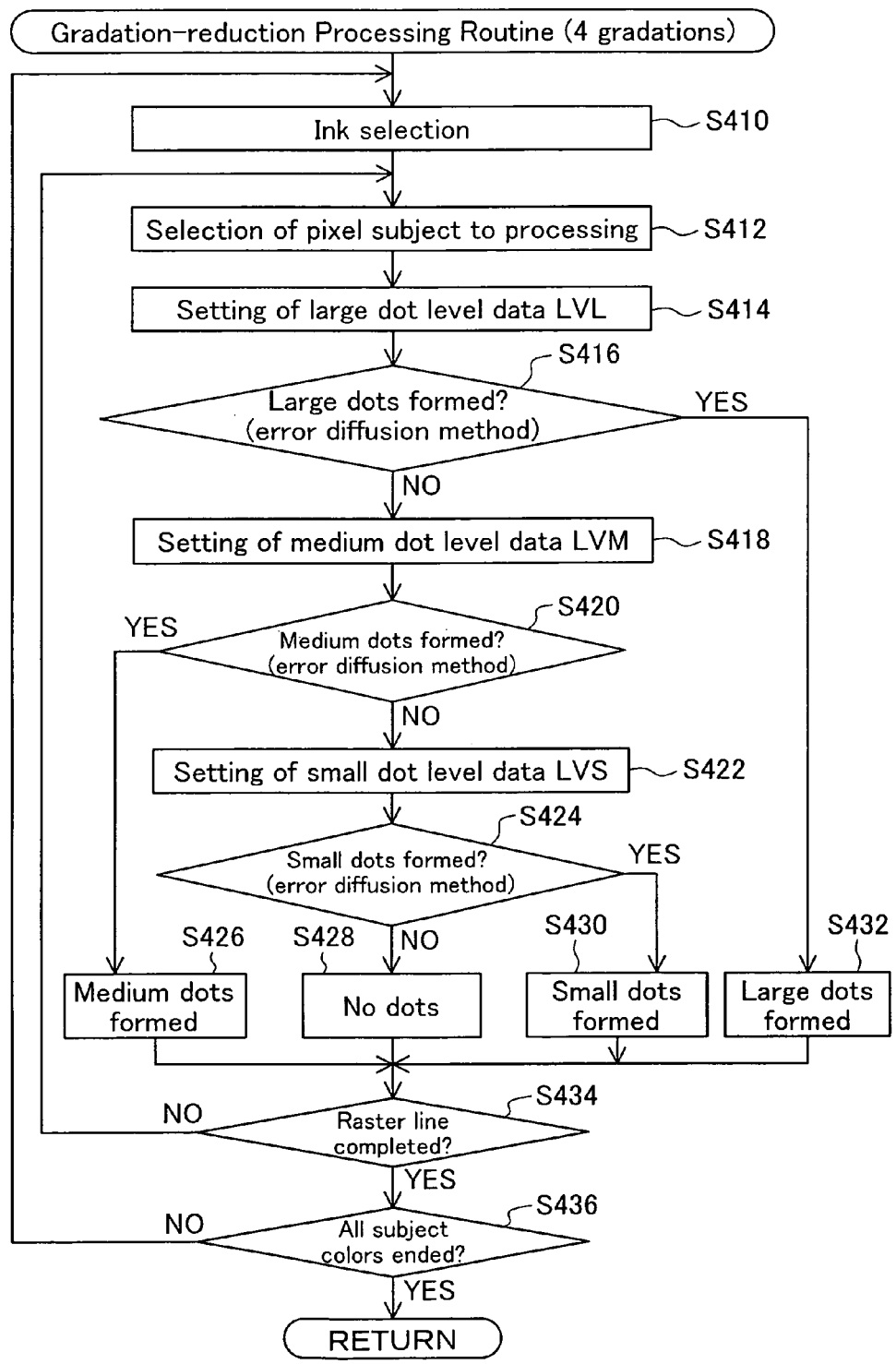
FIG. 12 is a flow chart that shows the flow of the gradation-reduction process that is performed using the error diffusion method on the multiple gradation data of four inks C, M, LC, and LM.

FIG. 12 is a flow chart that shows the flow of the gradation-reduction processing that is performed using the error diffusion method on the multiple gradation data of the four inks C, M, LC, and LM. At step S410, the gradation-reduction module 99 (FIG. 1) selects one of the multiple gradation data of the four inks C, M, LC, and LM as the subject of gradation-reduction processing.

At step S412, the gradation-reduction module 99 selects a pixel to be subject to processing. Pixel selection is performed in sequence in the main scan direction as in the A row pixels (FIG. 10(a), 10(b)) and B row pixels.

At step S414, the gradation-reduction module 99 sets the level data LVL of large dots while referencing the dot recording rate table DT (FIG. 1). Level data means data for which the dot recording rate is converted to 256 levels of values 0 to 255.

Figure 13:
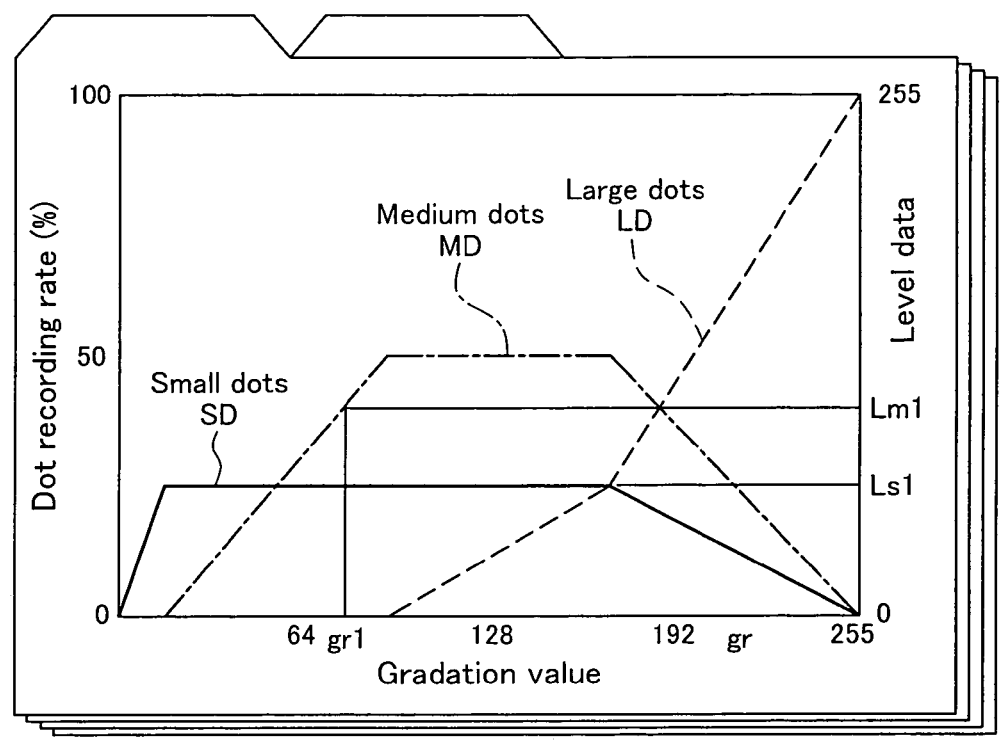
FIG. 13 is an explanatory diagram that shows the dot recording rate table DT used for determining the level data of the three sizes large, medium, and small.

FIG. 13 is an explanatory diagram that shows the dot recording rate table DT used for determining the level data of three sizes of dots, large, medium, and small. In the dot recording rate table DT's horizontal axis is shown the gradation value (0 to 255), and in the vertical axis at the left side is shown the dot recording rate (%), and in the vertical axis at the right side is shown the level data (0 to 255). In this figure, the curve SD shows the small dot recording rate, the curve MD shows the medium dot recording rate, and the curve LD shows the large dot recording rate.

The level data LVL is data for which the dot recording rate of the large dots is converted, level data LVM is data for which the dot recording rate of the medium dots is converted, and level data LVS is data for which the dot recording rate of the small dots is converted. For example, with the example shown in this figure, if the multiple gradation data gradation value is gr1, the large dot level data LVL is obtained as zero using the curve LD, the medium dot level data LVM is obtained as Lm1 using the curve MD, and the small dot level data LVS is obtained as Ls1 using the curve SD.

At step S416, the gradation-reduction module 99 determines whether or not large dots are formed according to the level data LVL. This determination is performed using the error diffusion method.

Figure 14A:
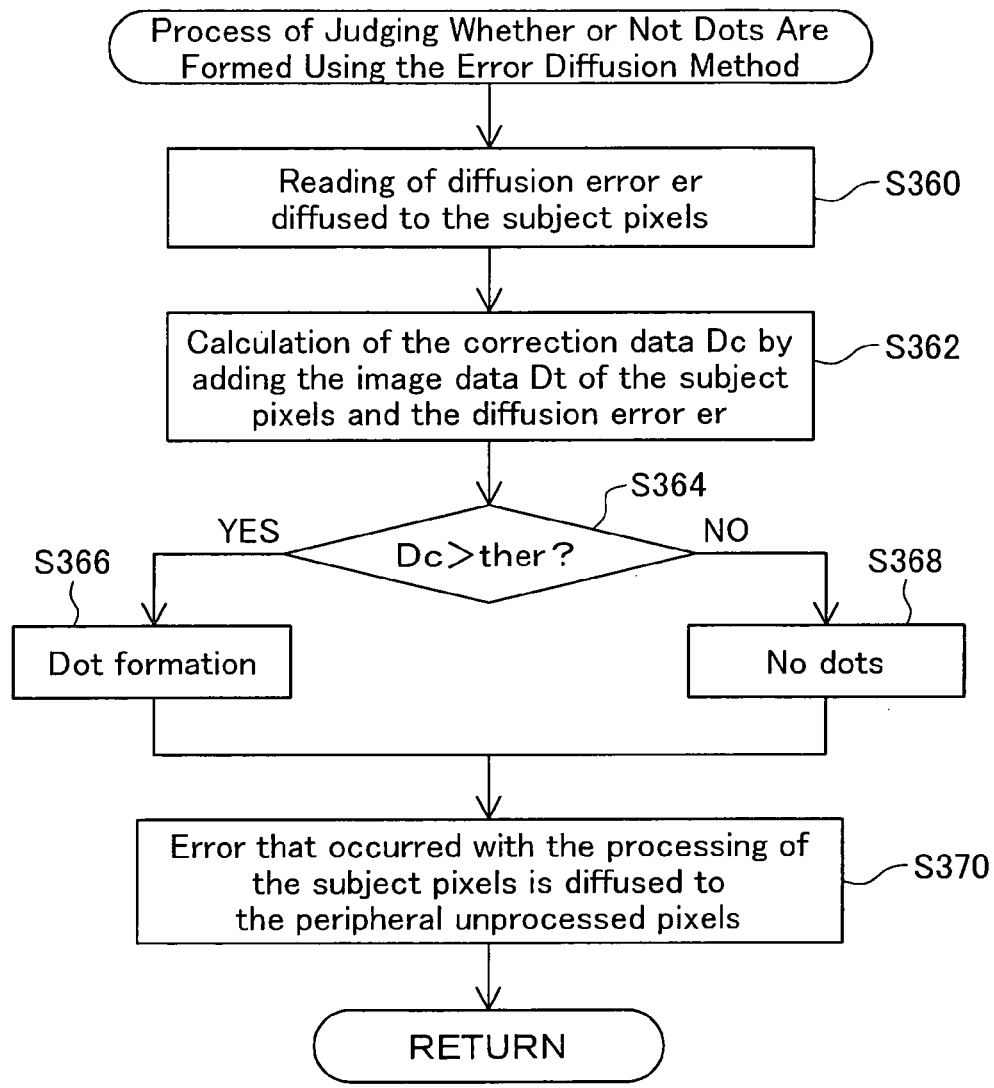
FIGS. 14(*a*) and 14(*b*) are explanatory diagrams that show the contents of error diffusion processing for the first embodiment of the present invention.
Figure 14B:
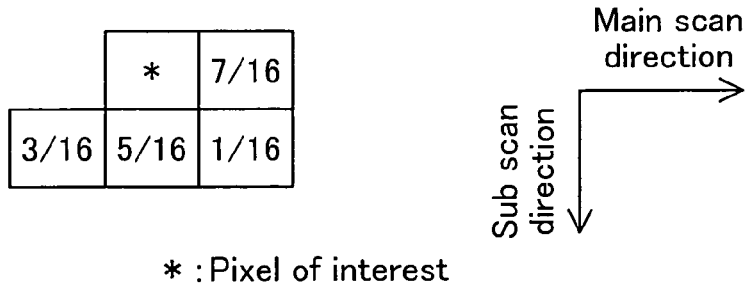

FIGS. 14(a) and 14(b) are explanatory diagrams that show the contents of the error diffusion processing of the first embodiment of the present invention. FIG. 14(a) is a flow chart that shows the flow of the error diffusion processing. FIG. 14(b) is an explanatory diagram that shows the weighting coefficient of the error diffused to peripheral pixels as the error diffusion method. With the example in FIG. 14(b), having the pixel of interest shift in the rightward direction of the main scan is a prerequisite (step S412). The "pixel of interest" is the pixel that is subject to the process of determining whether or not dots are formed. With this embodiment, as the weighting coefficient of error diffusion, the Floyd & Steinberg type is used.

At step S360, the gradation-reduction module 99 reads diffusion error er that is diffused from the other multiple printing pixels that have already been processed for the pixel of interest. At step S362, the gradation-reduction module 99 reads the image data Dt of the pixel of interest and also adds the error diffusion er to the read image data Dt and generates the correction data Dc. With this example, the image data Dt is the large dot level data LVL.

At the step S364, the gradation-reduction module 99 compares the correction data Dc with a preset threshold value Thre. As a result, when the correction data Dc is greater than the threshold value Thre, it is determined that dots are formed (step S366). Meanwhile, when the correction data Dc is smaller than the threshold value Thre, it is determined that dots are not formed (step S368).

At step S370, the gradation-reduction module 99 calculates the gradation error, and diffuses the error to the peripheral unprocessed printing pixels. The gradation error is the difference between the correction data Dc and the actual gradation value that occurs due to determination of whether or not dots are formed. For example, when the gradation value of the correction value Dt is "223," and the gradation value that actually occurred due to dot formation is 255, then the gradation error is "−32," (=223−255).

The gradation error is diffused to the peripheral unprocessed printing pixels using the error diffusion weighting coefficient (FIG. 14(b)). For example, for the printing pixel that is adjacent to the right of the pixel of interest, an error of "−14" (=−32×7/16) is diffused. When the error diffusion ends, the process returns to either step S418 (FIGS. 14(a) and 14(b)) or step S432. The process returns to step S432 when it is determined that large dots are formed. The process returns to step S418 when it is determined that large dots are not formed.

At step S418, the gradation-reduction module 99 sets the medium dot level data LVM. The setting method is the same as when setting the large dot level data LVL. At step S420, the gradation-reduction module 99 determines whether or not medium dots are formed according to the level data LVM. This determination is performed using the same process as for the large dots. Furthermore, the same process is used for the small dots as for the large dots and medium dots (steps S422, S424, S428, and S430).

When this kind of process is performed on all pixels that belong to a raster line (step S434), the process advances to step S436. At step S436, when there is multiple gradation data of unprocessed ink left, the process returns to step S410, and the multiple gradation data of one of the unprocessed inks is selected.

When the above process is performed for the multiple gradation data of all four inks C, M, LC, and LM (step S436), the process advances to step S500 (FIG. 7).

In this way, with the gradation-reduction processing using error diffusion, when the processing of all the pixels that belong to each raster line is completed, a switch to multiple gradation data is performed. Performing of switching of multiple gradation data for each raster line is because with the error diffusion process, the processing results (diffusion error) of the pixels adjacent to the pixel of interest is used for the process of determining whether or not dots are formed for the pixel of interest, so it is possible to increase the hit rate of cache (not illustrated) that the CPU (not illustrated) is equipped with that computer 90 has.

Furthermore, since there are many cases when adjacent pixels have the same or approximate gradation values, there is the feature that there is a high possibility of forecasting the process when the process advances in the main scan direction or the sub scan direction. Because of this, since there is a high possibility of the branching forecast performed with pipeline processing with the CPU described above being correct, there is the advantage that it is possible to increase the processing speed.

This kind of increasing of efficiency of the process shows a marked effect with processes which have a relatively large arithmetic processing volume such as with the error diffusion method. The reason that the arithmetic processing volume is relatively high with the error diffusion method is that in contrast with the ordered dither method, operations of generating correction data Dc and of diffusion error are performed.

At step S500, the gradation-reduction module 99 performs gradation-reduction processing using the ordered dither method on the multiple gradation data of the three inks K, Y, and CL. The reason that the ordered dither method is used for the multiple gradation data of the three inks K, Y, and CL is because image quality is given precedence over processing speed since as described above, the dispersibility of these ink dots does not greatly affect image quality.

Figure 15:
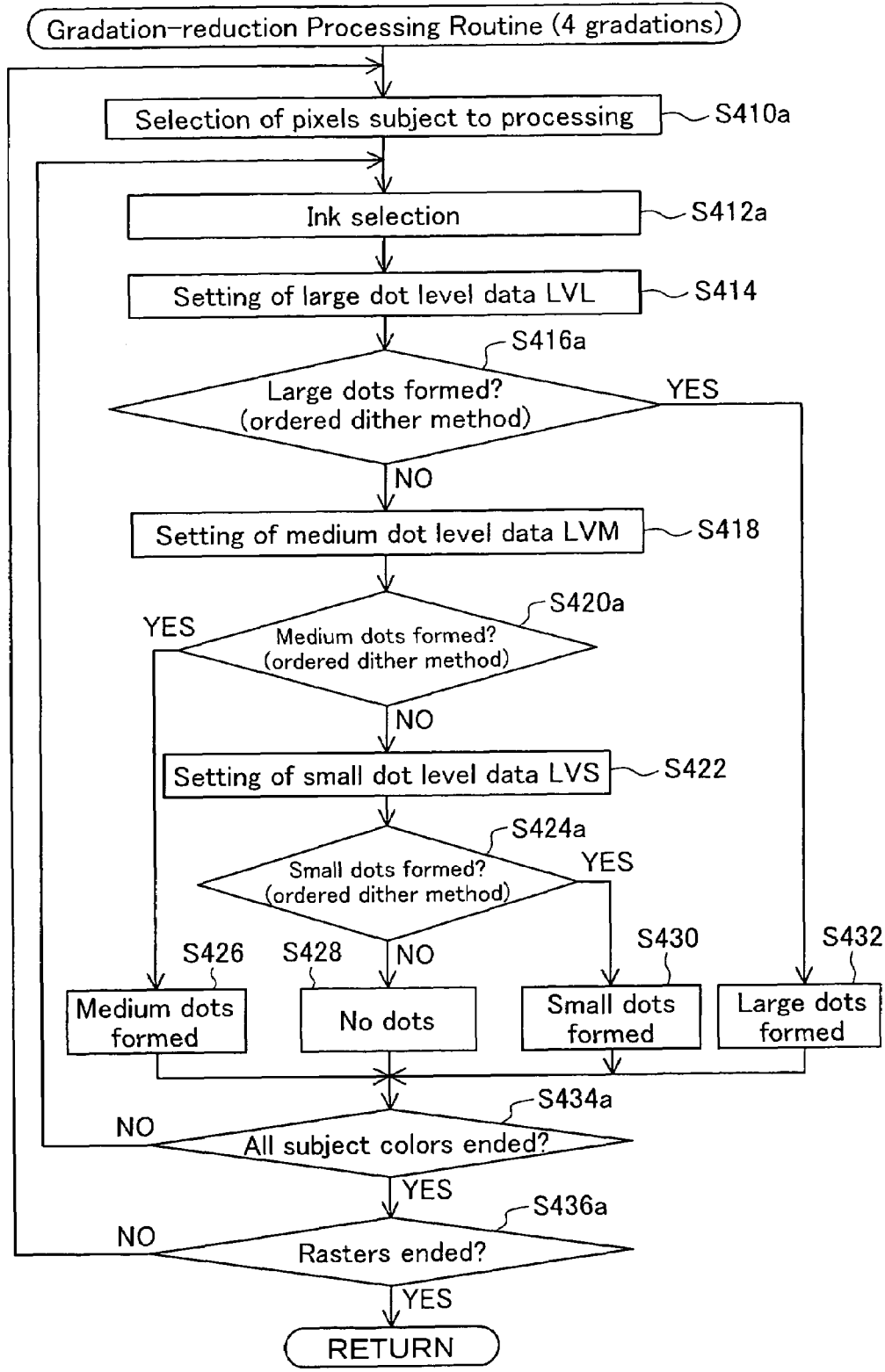
FIG. 15 is a flow chart that shows the flow of the gradation-reduction processing that is performed using an ordered dither method on the multiple gradation data of three inks K, Y, and CL.

FIG. 15 is a flow chart that shows the flow of gradation-reduction processing performed using the ordered dither method on the multiple gradation data of the three inks K, Y, and CL. With this gradation-reduction process, whether or not dots are formed is performed using the ordered dither method rather than the error diffusion method (step S416a, step S420a, and step S424a).

At step S410a, the gradation-reduction module 99 selects pixels subject to processing. The selection method is the same as the gradation-reduction process that uses error diffusion. At step S412a, the gradation-reduction module 99 selects one of the multiple gradation data of the three inks K, Y, and CL as subject of the gradation-reduction process.

At step S414, the gradation-reduction module 99 sets the large dot level data LVL while referencing the dot recording rate table DT in the same way as with gradation-reduction processing using error diffusion.

At step S416a, the gradation-reduction module 99 determines whether or not large dots are formed according to the level data LVL. This determination is made using the ordered dither method.

FIGS. 16(a) and 16(b) are explanatory diagrams that show the method for determining whether or not dots are formed using the ordered dither method. FIG. 16(a) is an explanatory diagram that shows the concept of whether or not there is dot formation according to the ordered dither method. For purposes of illustration, only part of the pixels is shown. As shown in FIG. 16(a), a size comparison is done of each pixel of the level data LVL and the corresponding locations in the dither table. When the level data LVL is greater than the threshold value THL shown in the dither table, dots are formed, and when the level data LVL is smaller, dots are not formed. The pixels with cross hatching in FIG. 16(a) mean pixels for which dots are formed.

FIG. 16(b) is an explanatory diagram that shows the relationship between the dither matrix used for judging the black dots formed with black ink and the dither matrix used for judging the yellow dots formed with yellow ink and the transparent dots formed with quality-enhancing ink CL. With this embodiment, as shown in the figure, the first dither matrix TM is used for black dots, and the second dither matrix UM which is completely different from the first dither matrix is used for the yellow dots and transparent dots. With this embodiment, a 64×64 matrix is used as described previously, but in FIG. 16(b), for purposes of illustration, a 4×4 matrix is shown.

The reason that the threshold value for the reference for whether or not dots are formed with black dots and yellow dots are formed differently is to reduce the probability of black dots and yellow dots being formed overlapping. Specifically, if the on and off judgment is performed using the same dither matrix for black dots and yellow dots, pixels for which dots go on easily will match for both. In other words, there is a high possibility that when block dots are off, the yellow dots will also be off. As a result, the black dot recording rate may become lower than the desired recording rate.

With this embodiment, to avoid this kind of phenomenon, the dither matrix is changed for both. In other words, by changing the position of pixels which turn on easily for black dots and yellow dots, the structure is such that each of these is formed appropriately. Note that dither matrix switching is performed during ink selection at step S412a.

Meanwhile, with the yellow dots and transparent dots, the same dither matrix is used. Specifically, switching of the dither matrix is not performed, and immediately before or immediately before the judgment of whether or not yellow dots are formed, a judgment will be made of whether or not transparent dots are formed. This is because transparent dots do not have an excessive effect on image quality even if they are formed overlapping because they are transparent, and considering this, this is structured to reduce the processing time required for switching the dither matrix. Note that with black dots and transparent dots, it is also possible to have a structure such that the same dither matrix is used.

At step S416a, the gradation-reduction module 99 determines that large dots should be on when the level data LVL is greater than the threshold value THL (step S432). Meanwhile, at step S416a, the gradation-reduction module 99 determines that the large dots should not be formed when the level data LVL is smaller than the threshold value THL and the process advances to step S418.

At step S418, the gradation-reduction module 99 sets the medium dot level data LVM. The setting method is the same as setting the large dot level data LVL. At step S420a, the gradation-reduction module 99 determines whether or not medium dots are formed according to the level data LVM. This determination is performed using the same process as with large dots. Furthermore, the same process is performed for small dots as for large dots and medium dots (step S422, S424a, S428, and S430).

When this kind of process is performed for multiple gradation data of all of the three subject inks (step S434a), the process advances to step S436a. At this time, for pixels for which processing is completed, the dot data generation is also completed, so this is transmitted in sequence to the print data generating module 100. By doing this, it is possible to reduce the memory usage volume as memory used for the gradation-reduction module 99 is released in sequence. Furthermore, when dot data is generated for each pixel, the color conversion process (step S300 (FIG. 7)) may also be performed for each pixel that is subject to processing, so this also allows a reduction of memory consumption.

In this way, for gradation-reduction processing using ordered dither, the decrease in the volume of memory used takes precedence over making the processing at the CPU more efficient. This is because with gradation-reduction processing using organized dither, the arithmetic processing volume is relatively low, so reducing the volume of memory used is linked to more efficient processing.

At step S436a, when there are unprocessed pixels remaining, the process returns to step S410a and the pixels to be subject to processing are selected. When these processes are performed on all the pixels that belong to a raster line (step S436a), the process advances to step S600 (FIG. 7).

At step S600, the print data generating module 100 realigns the dot data that shows the formation status of dots for each printing pixel in the data sequence to be transferred to the color printer 20, and this is output as final print data PD. The print data PD includes raster line data that shows the dot recording status during each main scan, and the data that shows the sub scan feed volume. Note that with this embodiment, the processes of step S500 and step S600 are performed in parallel to reduce the volume of memory used as described previously.

In this way, with the first embodiment, with the gradation-reduction process using the error diffusion method which has a relatively high arithmetic processing volume, processing is performed for each raster line including many pixels, and with the gradation-reduction process using the ordered dither method which has a relatively low arithmetic processing volume, processing is performed for each pixel. As a result, with the gradation-reduction processing that has a relatively high arithmetic processing volume, the most can be made of the CPU pipeline processing, which allows for high speed processing, and with gradation-reduction processing which has a relatively low arithmetic processing volume, it is possible to try to make the process more efficient by reducing the memory consumption volume.

C. Printing Data Generating Process for the Second Embodiment

FIG. 17 is an explanatory diagram that shows a pixel block which is a unit for executing the gradation-reduction process using the ordered dither method for the second embodiment of the present invention. With this embodiment, in contrast to the first embodiment for which processing was done for each pixel, a pixel block Ps is generated by combining four printing pixels Pa, Pb, Pc, and Pd with two vertical and horizontal rows each.

In this way, the units for which gradation-reduction processing is executed using the ordered dither method may also be pixel blocks that include a plurality of pixels. However, in the case of this example, units for which gradation-reduction processing is executed using the error diffusion method are preferably two raster lines that are continuous such that the sub scan direction pixel width matches. This is because by doing this, it is possible to simplify the selection process of pixels that are subject to each gradation-reduction process.

Note that the sub scan direction pixel width does not necessarily have to be one pixel or two pixels. However, it has been confirmed by experiments that a 2 to 3 pixel width is preferable.

D. Variation Examples

Note that the present invention is not limited to the aforementioned embodiments and embodiments, and it is possible to implement various embodiments in a scope that does not stray from the key points, such as the following variations.

D-1. With each of the embodiments described above, the threshold value used for generating the transparent dot data uses the same value left as is as the threshold value used for generating the colored dot data, but for example, it is also possible to shift the dither matrix in the line direction or column direction and use this. Generally, the threshold value used for generating the transparent dot data for the present invention may also be generated using the threshold value generated from the dither matrix used for generating the colored dot data. This is because by doing this, it is possible to reduce the time required for reading the threshold value from the main memory or hard disk and to improve the processing speed.

However, with a structure that uses the same value for the threshold value used in generating the transparent dot data used for generating the colored dot data, there is a marked effect when using quality-enhancing ink or printing media of a type for which it is desirable to form improved dots overlapped with colored dots. For example, there is a case of printing on plain paper or some other printing medium with relatively low glossiness. In this case, by having quality-enhancing ink land overlapping on colored ink, excessive ink absorption that occurs with plain paper is suppressed, and by doing this, it is possible to suppress coloring unevenness of the colored ink.

It is also possible to have the threshold value used for generating the transparent dot data be a value stored in a different element from the element used in generating the colored dot data in the dither matrix, for example. By doing this, there is a high probability that the threshold value will remain within cache, so it is possible to decrease the number of times of reading the threshold value from the main memory or hard disk.

However, with this kind of structure, it is preferable for the threshold value to be a value stored in the element that is arranged at a position shifted by at least a row or a column in relation to the element used for generating the colored dot data in the dither matrix. This is because by doing this, by suitably adjusting the shift direction and volume, it is possible to further increase the possibility of having the threshold value remain in cache.

Furthermore, it is also possible to have the threshold value that is used for generating the transparent dot data be a value that is generated by subtracting the threshold value used for generating the colored dot data from a specified value. This structure shows a marked effect when using a quality-enhancing ink or printing medium of a type for which it is desirable that the enhanced dots be formed overlapping the colored dots. This is because in this case, there is a tendency for the glossiness to become stronger for areas with the greater the colored ink volume, so it is possible to suppress unevenness of glossiness if made so that more quality-enhancing ink is ejected using pixels for which dot formation is difficult. Here, it is possible to use maximum values for the specific dither matrix, for example, for the "specified value."

D-2. With the dot data generating process of each of the embodiments described above, the type of ink that is subject to processing is switched each time the processing of each pixel is completed or each time the processing of a square pixel block is completed, but it is also possible to structure this such that the type of ink subject to processing is switched each time the processing of another shape of pixel block is completed.

D-3. With each of the embodiments described above, dot data generating processing is performed one color at a time for each pixel or for each pixel block. Specifically, the formation status of each size dot is determined for each pixel or each pixel block. Here, the dot formation status is a status expressed by one of "no dots formed," "small dots formed," "medium dots formed," and "large dots formed."

However, the gradation-reduction processing to which the present invention can be applied is not limited to this kind of structure, but can also be structured so that, for example, continuous processing is done of whether or not formation is done of any of each size dot for colored ink (e.g. yellow ink) and quality-enhancing ink that share a dither matrix. Specifically, it is also possible to structure this so that processing continues for each size dot for each pixel. Here, the colored ink that shares a dither matrix correlates to the "specific colored ink" in the claims.

In specific terms, for example in the flow chart in FIG. 15, the structure can be such that at step S412*a*, both inks of the yellow ink and quality-enhancing ink are selected, and at the level data setting steps (step S414, step S418, and step S422), while both level data are set, at the steps that determine whether or not dots are formed (step S416, step S420, and step S424), a judgment can be made of whether both dots are formed.

In this way, possible structure examples include a structure for which dot data generating processing continues for each pixel, a structure for which dot data generating processing continues for each pixel block, and a structure for which dot data generating processing continues for each size dot for each pixel.

Specifically, immediately after processing is completed for pixels, pixel blocks, or each size dot formed on a pixel for a specific colored ink, processing is performed for pixels, pixel blocks, or each size dot formed on a pixel for the quality-enhancing ink, or alternatively, immediately after processing is completed for pixels, pixel blocks, or each size dot formed on a pixel for the quality-enhancing ink, processing is performed for pixels, pixel blocks, or each size dot formed on a pixel for a specific colored ink. In this way, generally, the gradation-reduction unit used with the present invention may be structured so as to generate transparent dot data successively with colored dot data that share a dither matrix.

D-4. With each of the embodiments described above, the error diffusion method and the ordered dither method are used for generating the colored dot data, but it is also possible to generate all the ink dot data using the ordered dither method. With the present invention, it is also possible to structure this so that at least part of the colored dot data and the transparent dot data are generated using the ordered dither method.

D-5. With each of the embodiments described above, we explained an. example of an inkjet printer equipped with a piezo element, but it is also possible to use this for various printers and other printing devices including the type of printer that ejects ink with bubbles that occur within the ink by making conductive a heater equipped with a so-called nozzle.

D-6. In any of the above embodiments, part of the hardware configuration may be replaced by the software configuration, while part of the software configuration may be replaced by the hardware configuration. For example, part or all of the functions of the printer driver 96 shown in FIG. 1 may be executed by the control circuit 40 in the printer 20. In this modified structure, the control circuit 40 of the printer 20 exerts part or all of the functions of the computer 90 as the print control device that generates print data.

When part or all of the functions of the invention are attained by the software configuration, the software (computer programs) may be stored in computer-readable recording media. The 'computer-readable recording media' of the invention include portable recording media like flexible disks and CD-ROMs, as well as internal storage devices of the computer, such as various RAMs and ROMs, and external storage devices fixed to the computer, such as hard disks.

Finally, the Japanese Patent Application (Patent Application No. 2003-313764 (Application date: Sep. 5, 2003)) on which the priority claim of this application is based is included in the disclosure for reference.

What is claimed is:

1. A printing control method of generating print data to be supplied to a print unit to print, the print unit capable of forming dots on a print medium by ejecting at least one type of colored ink containing a color material and a quality-enhancing ink for enhancing quality of a printed material, the printing control method comprising:

(a) a color conversion step of converting pixel values into multiple gradation data of each ink, the pixel values representing color of each pixel of given image data, the multiple gradation data of each ink expressing the color of the pixel by using the colored ink and the quality-enhancing ink available in the print unit; and (b) a gradation-reduction step of generating at least part of colored dot data and transparent dot data by ordered dither method, according to the generated multiple gradation data of each ink by the color conversion, the colored dot data representing formation status of colored dots formed with the colored ink on each of printing pixels, the transparent dot data representing formation status of transparent dots formed with the quality-enhancing ink on each printing pixel; wherein the gradation-reduction step includes a step of generating the transparent dot data in succession with specific colored dot data using a quality-enhancing ink threshold value, the quality-enhancing ink threshold value having a value generated according to a value read from a specific dither matrix used for generating the specific colored dot data for a specific colored ink, and the quality-enhancing ink threshold value being a value stored in an element arranged in a position shifted for at least one of row and column in relation to an element used for generating the specific colored dot data within the specific dither matrix.

2. The printing control method in accordance with claim 1, wherein
the quality-enhancing ink threshold value is the same value as the threshold value used for generating the specific colored dot data.

3. The printing control method in accordance with claim 1, wherein
the quality-enhancing ink threshold value is a value generated by subtracting the threshold value used for generating the specific colored dot data from a specified value.

4. The printing control method in accordance with claim 1, wherein
the printing control method is equipped with a first printing mode and a second printing mode,
the first printing mode is a printing mode for which the quality-enhancing ink threshold value is the same value as the threshold value used for generating the specific colored dot data, and the second printing mode is a printing mode for which the quality-enhancing ink threshold value is a value generated by subtracting the threshold value used for generating the specific colored dot data from the specified value.

5. The printing control method in accordance with claim 1, wherein the quality-enhancing ink threshold value is a value stored in a different element from the element used for generating the specific colored dot data for the same pixel within the specific dither matrix.

6. A printing method of printing by ejecting inks to form dots on a printing medium, the printing method comprising the steps of:

(a) providing a print unit capable of forming dots on a print medium by ejecting at least one type of colored ink containing a color material and a quality-enhancing ink for enhancing quality of a printed material;

(b) converting pixel values into multiple gradation data of each ink, the pixel values representing color of each pixel of given image data, the multiple gradation data of each ink expressing the color of the pixel by using the colored ink and the quality-enhancing ink available in the print unit;

(c) generating at least part of colored dot data and transparent dot data by ordered dither method, according to the generated multiple gradation data of each ink by the color conversion, the colored dot data representing formation status of colored dots formed with the colored ink on each of printing pixels, the transparent dot data representing formation status of transparent dots formed with the quality-enhancing ink on each printing pixel; and (d) controlling the print unit to form dots on the print medium by ejecting the colored ink and the quality-enhancing ink in response to the colored dot data and the transparent dot data, wherein the step (c) includes a step of generating the transparent dot data in succession with specific colored dot data using a quality-enhancing ink threshold value, the quality-enhancing ink threshold value having a value generated according to a value read from a specific dither matrix used for generating the specific colored dot data for a specific colored ink, and the quality-enhancing ink threshold value being a value stored in an element arranged in a position shifted for at least one of row and column in relation to an element used for generating the specific colored dot data within the specific dither matrix.

7. A printing control apparatus for generating print data to be supplied to a print unit to print, the print unit capable of forming dots on a print medium by ejecting at least one type of colored ink containing a color material and a quality-enhancing ink for enhancing quality of a printed material, the printing control apparatus comprising:

a color converter configured to convert pixel values into multiple gradation data of each ink, the pixel values representing color of each pixel of given image data, the multiple gradation data of each ink expressing the color of the pixel by using the colored ink and the quality-enhancing ink available in the print unit; and a gradation-reduction module configured to generate at least part of colored dot data and transparent dot data by ordered dither method, according to the generated multiple gradation data of each ink by the color conversion, the colored dot data representing formation status of colored dots formed with the colored ink on each of printing pixels, the transparent dot data representing formation status of transparent dots formed with the quality-enhancing ink on each printing pixel, wherein the gradation-reduction module is configured to generate the transparent dot data in succession with specific colored dot data using a quality-enhancing ink threshold value, the quality-enhancing ink threshold value having a value generated according to a value read from a specific dither matrix used for generating the specific colored dot data for a specific colored ink, and the quality-enhancing ink threshold value being a value stored in an element arranged in a position shifted for at least one of row and column in relation to an element used for aenerating the specific colored dot data within the specific dither matrix.

8. A printing apparatus for printing by forming dots on a printing medium, the printing apparatus comprising:

a print unit capable of forming the dots on a print medium by ejecting at least one type of colored ink containing a color material and a quality-enhancing ink for enhancing quality of a printed material;

a color converter configured to convert pixel values into multiple gradation data of each ink, the pixel values representing color of each pixel of given image data, the multiple gradation data of each ink expressing the color of the pixel by using the colored ink and the quality-enhancing ink available in the print unit; and a gradation-reduction module configured to generate at least part of colored dot data and transparent dot data by ordered dither method, according to the generated multiple gradation data of each ink by the color conversion, the colored dot data representing formation status of colored dots formed with the colored ink on each of printing pixels, the transparent dot data representing formation status of transparent dots formed with the quality-enhancing ink on each printing pixel; wherein the gradation-reduction module is configured to generate the transparent dot data in succession with specific colored dot data using a quality-enhancing ink threshold value, the quality-enhancing ink threshold value having a value generated according to a value read from a specific dither matrix used for generating the specific colored dot data for a specific colored ink, and the quality-enhancing ink threshold value being a value stored in an element arranged in a position shifted for at least one of row and column in relation to an element used for generating the specific colored dot data within the specific dither matrix.

9. A computer-readable storage medium having a computer program stored thereon, the computer proaram causing a computer to generate print data to be supplied to a print unit to print, the print unit capable of forming dots on a print medium by ejecting at least one type of colored ink containing a color material and a quality-enhancing ink for enhancing quality of a printed material, the computer program comprising:

a first program for causing the computer to convert pixel values into multiple gradation data of each ink, the pixel values representing color of each pixel of given image data, the multiple gradation data of each ink expressing the color of the pixel by using the colored ink and the quality-enhancing ink available in the print unit; and a second program for causing the computer to generate at least part of colored dot data and transparent dot data by ordered dither method, according to the generated multiple gradation data of each ink by the color conversion, the colored dot data representing formation status of colored dots formed with the colored ink on each of printing pixels, the transparent dot data representing formation status of transparent dots formed with the quality-enhancing ink on each printing pixel; wherein
the second program includes a program for causing the computer to generate the transparent dot data in succession with specific colored dot data using a quality-enhancing ink threshold value, the quality-enhancing ink threshold value having a value generated according to a value read from a specific dither matrix used for generating the specific colored dot data for a specific colored ink, and the quality-enhancing ink threshold value being a value stored in an element arranged in a position shifted for at least one of row and column in relation to an element used for generating the specific colored dot data within the specific dither matrix.

* * * * *